Dec. 22, 1970  J. M. MYERS  3,548,576
TEA HARVESTER

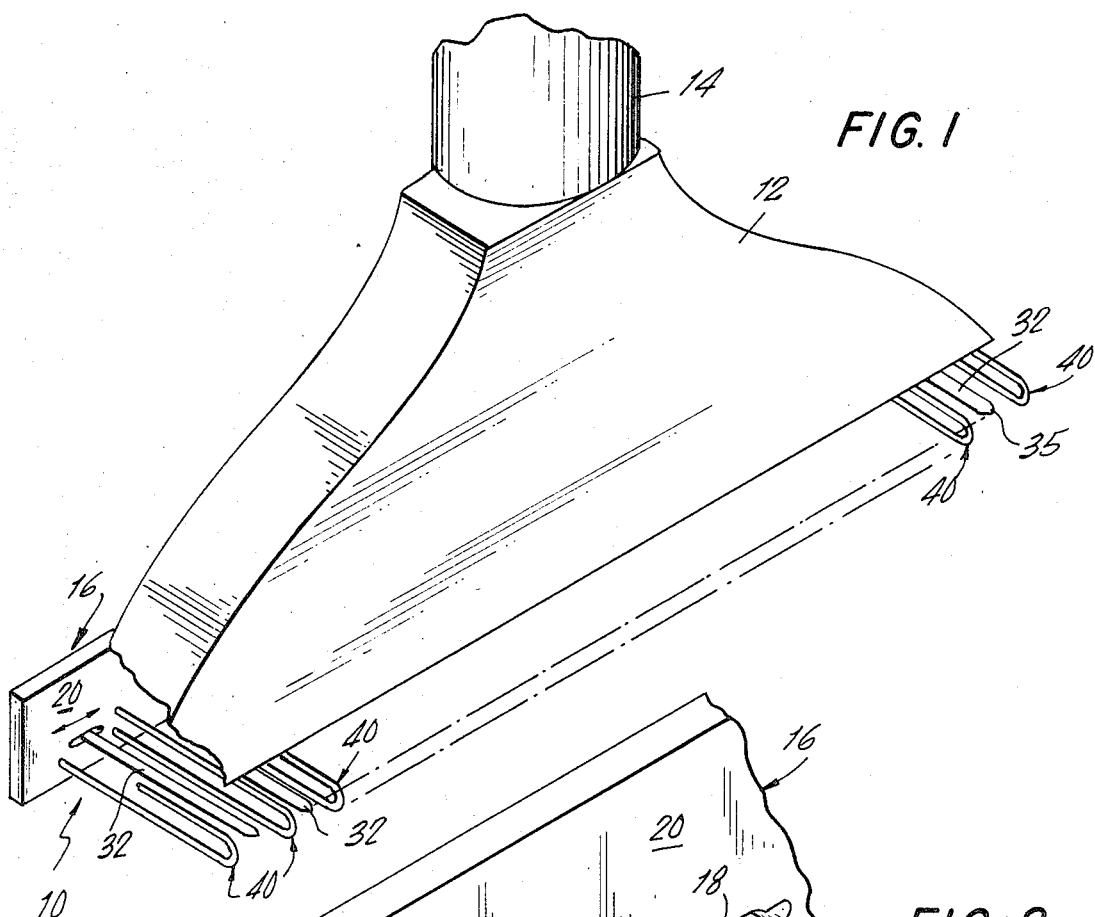
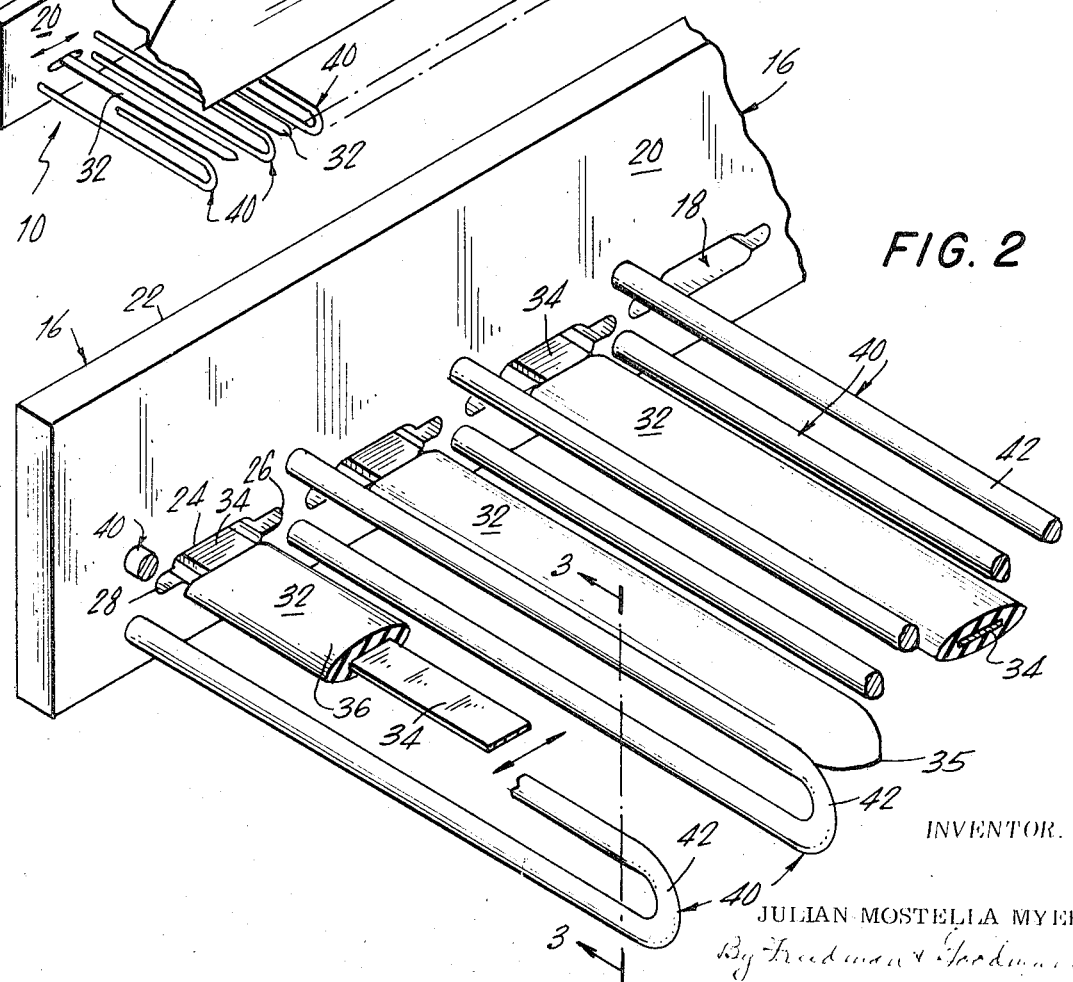

Filed Nov. 24, 1967  2 Sheets-Sheet 2

INVENTOR.
JULIAN MOSTELLA MYERS
BY
*Friedman & Goodman*
ATTORNEYS

United States Patent Office 3,548,576
Patented Dec. 22, 1970

3,548,576
TEA HARVESTER
Julian Mostella Myers, Gainesville, Fla., assignor to O. H. Clapp & Co., Inc., Westport, Conn.
Filed Nov. 24, 1967, Ser. No. 685,560
Int. Cl. A01d 45/12
U.S. Cl. 56—327                    7 Claims

ABSTRACT OF THE DISCLOSURE

This invention is directed to a tea harvester in which oscillating means are adapted to move between stationary means, said tea harvester being further adapted to be adjustable to the height of the tea plants to be harvested, said oscillating means acting in association with said stationary means with the result that only ripe tea shoots are harvested thereby.

BACKGROUND OF THE INVENTION

(1) Field of the invention

This invention relates generally to a tea harvester. More particularly, this invention relates to a mechanical tea harvester which will harvest only those tea sprouts that are ripe for harvesting.

(2) Description of the prior art

The tea plant, from which the well-known beverage is made, is classified as an evergreen shrub. Originally cultivated only in China, India and Japan, it is now grown in many countries, including the United States. The tea plant, in its natural state, can grow as high as 15 to 30 feet, however, it is generally pruned to grow to between 3 and 5 feet by the commercial planter.

It is a major problem in the harvesting of tea that only the ripe tea sprout comprising the leaf bud and the first two leaves can be plucked for processing into tea. The staggering amount of 3,200 sprouts are needed to process one pound of tea as it is purchased on the market for home consumption. Generally, the harvesting of the tea sprouts or shoots is by hand, especially in those countries where agricultural labor is plentiful and labor costs are low, since no satisfactory mechanical tea harvester has been made which will be selective enough to pluck only the bud and the first two leaves at the end of each new shoot. Thus, this is the main reason why a satisfactory mechanical tea harvester has not yet been developed, for the harvester must be so extremely selective as to pluck only the ripe shoot. Moreover, inclusion of older, more coarse tea in the raw product results in a processed tea of poor quality.

An attempt has been made to use a mechanical harvester which was essentially a hedge clipper type. The latter gathered raw tea which contained a high percentage of unusable product, which was later hand sorted out at the processing plant, the theory being that the workers seated along a conveyor belt sorting tea would work more efficiently indoors than out in the hot tea fields. This type of harvesting was, of course, cumbersome and uneconomical and yielded poor quality tea, as well, indicating that selectivity in the field was far superior. Thus, it would be of tremendous advantage to produce a mechanical tea harvester which would pluck only the ripe tea sprouts at the situs, especially in those countries where labor costs are high.

SUMMARY OF THE INVENTION

It is therefore among one of the principal objectives of this invention to provide a mechanical tea harvester which will be highly selective for ripe tea sprouts, requiring little or no sorting after harvesting.

In accordance with the present invention, there has now been provided a selective, mechanical tea harvester comprising oscillating means adapted to move between stationary means, said oscillating means and stationary means being further adapted to be adjustable to the height of the tea plants to be harvested thereby, said oscillating means acting in sliding association with said stationary means so that only ripe tea shoots are resultingly harvested thereby.

BRIEF DESCRIPTION OF THE DRAWINGS

The invention will be hereinafter more fully described with reference to the accompanying drawings in which:

FIG. 1 is a fragmentary view in perspective showing the invention tea harvester, i.e. the selective harvesting mechanism of the invention, in association with an air pickup duct.

FIG. 2 is an enlarged fragmentary view in perspective showing the invention harvester.

DESCRIPTION OF THE PREFERRED EMBODIMENTS

Figure 3:
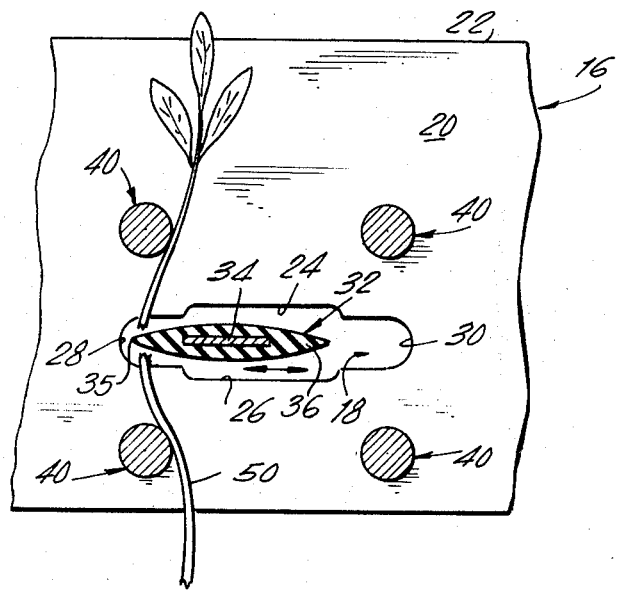
FIG. 3 is an enlarged fragmentary view taken along line 3—3 of FIG. 2 and showing a tea plant bracketed within the harvesting device and a ripe sprout plucked thereby.

Referring now to the figures of the drawings, for purposes of illustration, FIG. 1 depicts the invention tea harvester 10, as employed in association with an air pickup duct 12 for delivering the harvested tea shoot to a suitable collector (not shown) by means of duct pipe 14. However, it is to be understood that the invention is not to be limited in usage only with an air pickup duct since it may be employed in association with other conventional gathering means, such as a moving conveyor belt, and the like, the invention residing in the mechanical tea harvester 10, itself. The said tea harvester 10 comprises a face plate 16 of substantially rectangular configuration and formed of a suitable metal, such as steel, stainless steel or the like. A series of apertures 18 are provided through the front and rear opposing walls 20 and 22, respectively of said face plate, said series of apertures 18 running in longitudinal fashion along said walls. Each of the apertures 18 has a pair of opposing horizontal side walls (FIGS. 2–4) 24 and 26 which taper at their respective ends to integrally form U shaped end walls 28 and 30. Through said apertures 18 are provided moving blades 32 at right angles to said face plate 16. The blades 32 are adapted to horizontally oscillate within said apertures 18 by connection to suitable mechanical means, not shown, which are conventional in nature. However, one particular type of oscillating drive means is disclosed by U.S. Pat. No. 2,544,443 and wherein there is also disclosed one manner of connecting the suction hood 12 to the face plate 16. Each of the blades 32 comprise a metal bar 34, preferably steel, encased in a rubber sleeve 36 which extend outwardly from front wall 20 and at right angles thereto. The rubber sleeve 36 overlays the band 34 so that a cross-section is achieved which conforms substantially to an elliptical two-edged, sword-like body, as can be seen from FIGS. 3 and 4. The band 34, and consequently rubber sleeve 36, have parallel opposing side edges which terminate integrally at the outer end in a tapered point. This tapered point 35 aids in the separation of the tea stalks when the harvester is proceeding through the plants in a forward direction, although this taper is not critical, since a blunt end is also satisfactory. Each of said blades 32 oscillates between a pair of stationary means 40 mounted to the front wall 20 of face plate 16. The stationary means 40 comprise a U shaped metal body 42 of circular cross-section (it may also be elliptical) mounted to the face plate 16 by suitable means, such as welding. The metal body 42 is also preferably steel. The blades 32 oscillate between the open portions of the U shaped body 42, the stationary means 40 being of sufficient length to comfortably accommodate this oscillation. Sleeve 36 may be, as mentioned, rubber; or it may be any other suitable flexible, pliable and energy adsorbing material.

In the operation of the invention, the tea sprouts (shoots) 50 are loaded as a beam between the stationary means 40 by the oscillating blades 32, as the harvester 10 is caused to move forward by conventional drive means, not shown, such as are employed to drive tomato pickers, grain combines, and the like. As will be described, the flexibility of the rubber sleeve 36 is a critical factor in achieving high selectivity for ripe tea shoots. The tender shoots are broken off when the blade 32 forces the tea shoot 50 between one of the opposing pairs of stationary means 40, as shown in FIG. 3.

Figure 4:
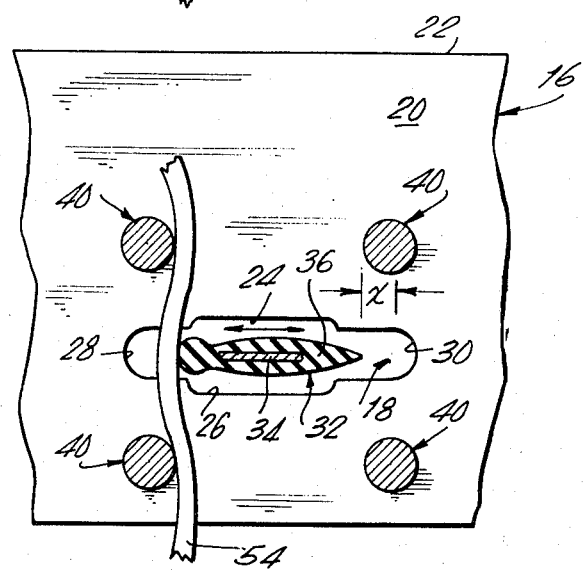
FIG. 4 is a view similar to FIG. 3 except that a coarse sprout is shown unbroken by the device.

Selectivity is attained by (1) setting the proper engagement between the stationary means 40 and the oscillating blade 32 at its maximum displacement, as shown in FIG. 4, and (2) having the proper rubber flexibility. When the tea sprout 50 is loaded, the total engagement is taken up partly by sprout deflection and partly by the rubber sleeve 36 deflection. The proportion of the engagement taken by each, i.e. sprout or sleeve, is proportional to their relative, respective stiffness.

There are three types of sprouts which will be bent between the blades 32 and stationary means 40. These are "too tender," "ripe for harvesting," and "too coarse." The bending of the "too tender" sprout will not result in fracture of the sprout because the engagement will be taken up by a large sprout deflection and a small rubber sleeve 36 deflection. The "too tender" sprout is not harvested because it can withstand the angle through which it is bent by the total engagement X without fracture. Putting it another way, the "too tender" sprout does not fracture because it must be bent through a larger angle than a "ripe for harvesting" sprout before it will fracture. This is an inherent characteristic of the "too tender" shoot.

On the other hand, the bending of a "ripe for harvesting" sprout results in fracture because, although the engagement length X is taken up by less sprout deflection and more rubber sleeve deflection, the applied bending force (resulting from both the compressed rubber sleeve and momentum of the oscillating body) is adequate to bend the stem of the sprout 50 beyond the yield point, as shown by FIG. 3. Thus, the "ripe for harvesting" sprout is fractured because it is not flexible enough to withstand the angle through which it is bent as was the case for the "too tender" shoot. The fracture angle of a shoot is related to its degree of maturity.

Finally, the loading of a "too coarse" sprout 54 results in little sprout bending and large rubbers 36 sleeve deflection; however, fracture of the sprout does not occur, because the sprout has adequate strength to withstand the applied bending force as shown by FIG. 4.

By raising or lowering the harvester 10, by changing the speed of the various driving means elements, and by other adjustments, the device can be made to compensate for the height of the tea plants, and the location of the tender shoots.

Figure 5:
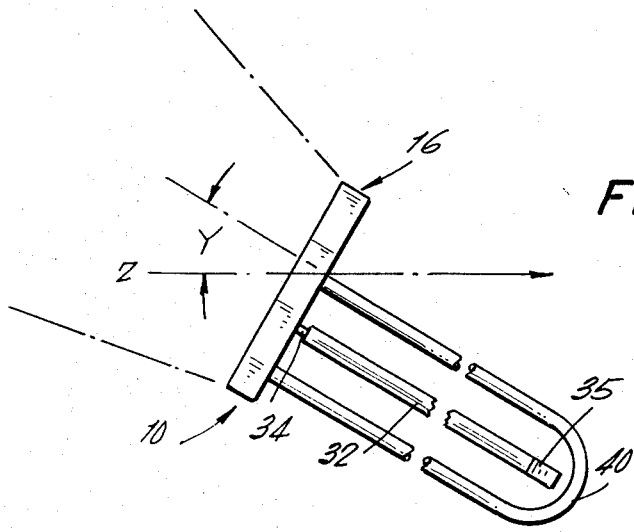
FIG. 5 is a fragmentary side view of the invention showing it in angular disposition to the horizontal.

It has been found particularly desirable and preferable to angularly adjust the harvester 10 at an angle Y from the horizontal Z (FIG. 5). This angle Y is preferably about 20–40 degrees, although this angular deflection will of course depend on the height of the sprout to be harvested. The harvester 10 is set at the ascertained angle in order to facilitate the location of the "ripe for harvest" point on a plant. The blades 32 will load the sprout initially at a "too coarse" point and they will gradually work their way up the sprout to the proper fracture point after a number of sensing oscillations. The sprout length traversed between blade loadings will be a function of the oscillating speed and the harvester forward speed and the angle of Y (FIG. 5). The means for supporting and adjusting the havester 10 are deemed to be well known in the art and, are not specifically disclosed herein.

It is to be understood that the number of blades 32 to a harvester will vary depending on the width harvester desired. Similarly, other dimensions can vary widely, as desired. In one specific embodiment, a harvester has been provided with upwards of 20 blades, with the stationary means 40 being about 2 inches apart from center to center, the blades 32 extending outwardly from face plate 16 about 6½ inches, and the metal body 42 being composed of 5/16 inch metal with the horizontal portions of the U shaped body 42 being about 0.625 inch apart, from center to center. The apertures 18 are 1.75 x 0.25 inch and the blades 32 are about 1.0 inch wide.

Having thus described the invention as applied to specific embodiments, it is to be understood that various changes may be made by those skilled in the art without departing from the spirit and scope thereof.

What is claimed is:

1. A tea harvesting device comprising in combination stationary means and oscillating means, said oscillating means comprising at least one rubber encased metal bar forming a blade, said stationary means comprising at least a pair of spaced-apart metal bodies of circular cross-section mounted to a face plate therefor, and said blade oscillating between the open portions of said pair of metal bodies to enable the selective cutting of only ripe tea shoots to resultingly harvest the same.

2. A device in accordance with claim 1, wherein said blade is connected to oscillating driving means through an aperture provided therefor in said face plate.

3. A device according to claim 1 wherein said metal bodies are essentially U shaped.

4. A device according to claim 3 wherein a plurality of blades and a plurality of pairs of said U shaped bodies are provided.

5. A device according to claim 1 wherein said rubber encasing said metal band conforms substantially to an elliptical two-edged cross-section.

6. A device according to claim 1 wherein said blade extends outwardly from, and at right angles to, said face plate.

7. A device according to claim 1 wherein said rubber encasing said metal band conforms substantially to an elliptical rounded-edge cross-section.

References Cited

UNITED STATES PATENTS

| 2,544,443 | 3/1951 | Brateng | 56—330 |

FOREIGN PATENTS

| 120,979 | 9/1959 | USSR | 56—327 |
| 140,623 | 4/1962 | USSR | 56—327 |
| 147,058 | 7/1962 | USSR | 56—327 |
| 148,629 | 4/1963 | USSR | 56—327 |

RUSSELL R. KINSEY, Primary Examiner